Dec. 24, 1968    F. L. BARTON, JR., ET AL    3,418,190
METHOD AND APPARATUS FOR BEDDING GLASS PLATES
FOR GRINDING AND POLISHING
Filed May 17, 1965

INVENTORS
Frank L. Barton, Jr. and
BY Leonard F. Kaiser

Nobbe & Swope
ATTORNEYS

United States Patent Office 3,418,190
Patented Dec. 24, 1968

3,418,190
METHOD AND APPARATUS FOR BEDDING GLASS PLATES FOR GRINDING AND POLISHING
Frank L. Barton, Jr., Perrysburg, and Leonard F. Kaiser, Maumee, Ohio, assignors to Libbey-Owens-Ford Glass Company, Toledo, Ohio, a corporation of Ohio
Filed May 17, 1965, Ser. No. 456,284
13 Claims. (Cl. 156—295)

ABSTRACT OF THE DISCLOSURE

Bedding glass blanks in a plaster-like material on surfacing tables by forming a fluid suspension of the bedding material, reducing the suspended particles of bedding material to a size not larger than a predetermined maximum, depositing the fluid suspension on the surfacing tables in a thin, uniform layer, and laying glass blanks on the tables while the layer is still wet and fluid.

---

Figure 1:
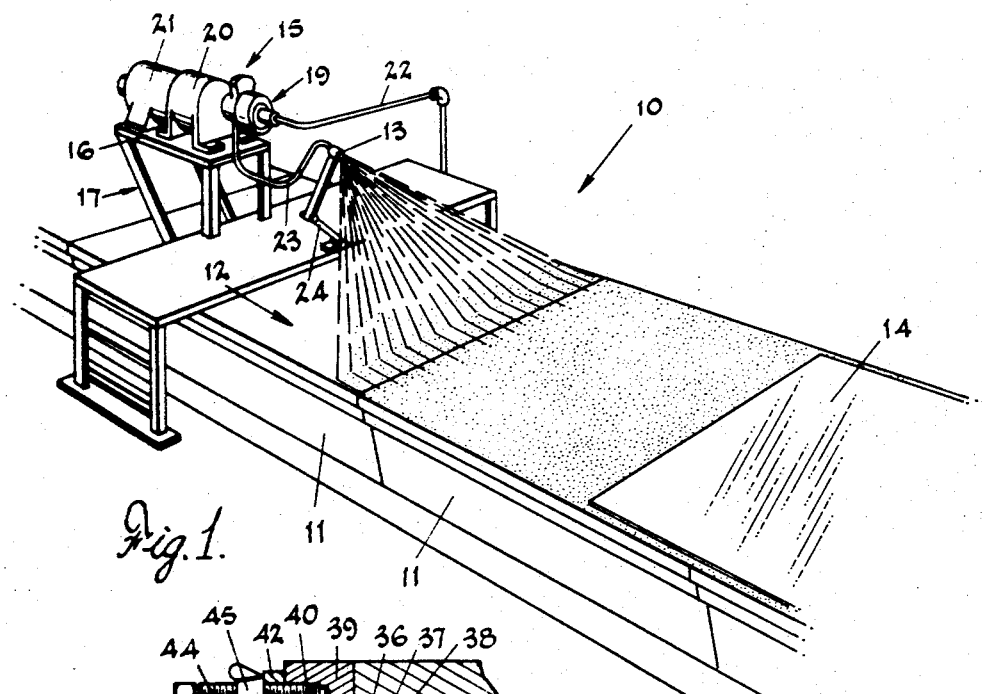

The present invention relates broadly to the surface finishing of glass sheets or plates. More particularly, it is concerned with the application of a layer of plaster, upon which the rough formed glass blanks to be surface finished can be bedded, to glass supporting tables.

In brief, the invention involves a novel and improved method and apparatus for bedding a plate glass blank in plaster or a similar material on a moving surfacing table, including reducing the plaster in a liquid suspension or slurry to an extremely small particle size having no particles over a predetermined maximum size, and continuously spraying the liquid suspension of finely divided plaster and water onto the surfacing table in a smooth, uniform layer.

In accordance with one widely practiced continuous method of grinding and polishing plate glass blanks, a plurality of the rough blanks are mounted upon a series of cars or tables arranged in end to end relationship for continuous movement in a definite, substantially horizontal path to carry the glass blanks first beneath and in engagement with a series of grinding heads, and then beneath and in engagement with a series of polishing units. The glass blanks are laid end to end upon the cars in slightly spaced relation, and are secured to the tops of the tables by being bedded in a layer of ordinary glass-laying plaster of Paris. The glass blanks are laid upon the layer of wet plaster and then pressed downwardly therein to expel air, usually by a rolling pressure applied to the upper surfaces of the blanks.

Heretofore, the plaster has generally been applied to the tops of the glass supporting tables by forming a liquid suspension of the plaster and then spraying the liquid suspension from a nozzle mounted above the path of the tables over an area of sufficient size to accommodate the glass blanks. The subsequent bedding of the blanks has not been entirely satisfactory due to the particle size distribution of the plaster, and particularly due to the presence of a small percentage of unusually large particles found therein. One such difficulty is that the larger particles are heavier so that as the liquid suspension of plaster is sprayed from the nozzle, the larger particles drop before the remainder of the plaster particles. As a result, the layer of plaster on the glass supporting tables passing beneath the spray nozzle contains a central region of larger particles, while the edge are composed primarily of fined material. This non-uniformity of the bedding material increases the required amount of plaster and adversely affects its bonding action.

The minimum thickness of the layer of plaster is determined to a certain extent by the size of the larger particles, and the layer has a tendency to be of reduced thickness toward the edges of the supporting tables. Thus, the sheet may not be uniformly bedded with its upper surface lying in a plane. As the sheet passes beneath the brinding runners, it may be deflected in certain areas so that the grinding action is not uniform over the entire surface.

The quality of the finish on the ground and polished plate glass with regard to the absence of waves and distortion, as well as the amount of breakage during the grinding and polishing operations, is largely dependent upon the proper bedding of the glass blanks upon the work tables. While the above described manner of applying plaster by spraying a liquid suspension thereof onto the work tables constitutes a significant advance over prior methods of application, such as manually slushing it onto the tables from buckets, further improvement has been desired in the actual bedding of the blanks on the tables.

It is an object of the present invention to provide an improved bedding of plaster on glass supporting tables wherein the glass sheet is uniformly bonded to the table over its entire area.

Another object of the invention is to substantially reduce the amount of plaster required to bed glass sheets on supporting tables for grinding and polishing.

Still another object is to provide a layer of plaster on glass supporting tables in which the rate of hydration is substantially increased so as to shorten the time necessary for the layer to develop its full bond strength.

Yet another object of the invention is to provide a layer of plaster for bedding glass sheets on supporting tables wherein the particle size of the plaster is extremely small and all of the particles are below a predetermined maximum size.

Other objects and advantages of the invention will become more apparent during the course of the following description when taken in connection with the accompanying drawings.

Figure 2:
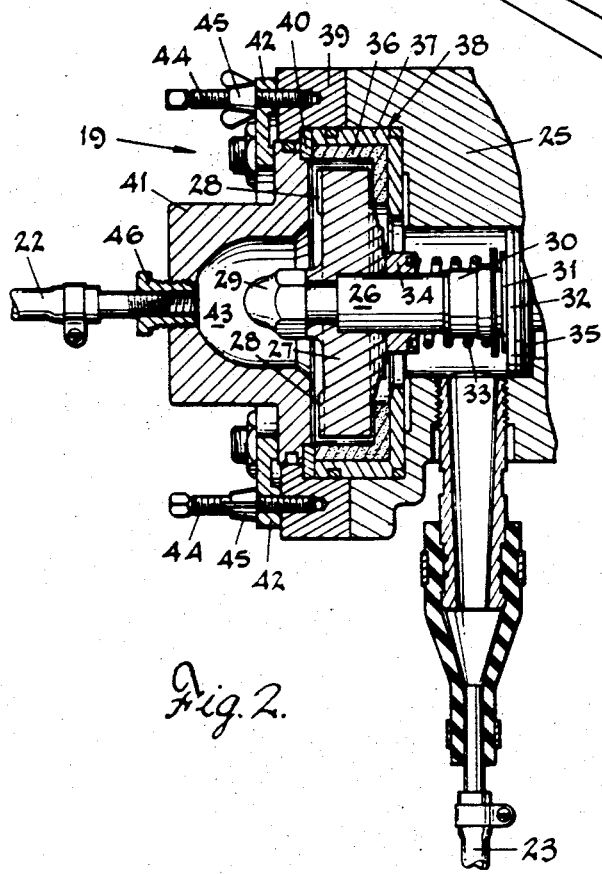

In the drawings, wherein like numerals are employed to designate like parts throughout the same:

FIG. 1 is a perspective view of a portion of a continuous glass grinding and polishing line, showing the apparatus of the invention in operative position; and FIG. 2 is an enlarged, fragmentary side elevation, partially in section, showing details of the grinding head of the colloid mill shown in FIG. 1.

According to the invention, a liquid suspension or slurry of plaster passes through a colloid mill where it is pulverized so that no particle is greater than about .003 to .005 inch in diameter. The slurry is then sprayed onto the surface of the supporting tables in a very thin layer, and glass blanks are bedded in the layer of plaster. As the plaster sets, it firmly secures the blanks to the supporting tables for grinding and polishing.

Referring now to the drawings, there is shown generally at 10 in FIG. 1 the laying yard of a continuous grinding and polishing system. As illustrated, the system includes a plurality of tables 11 having flat horizontal top surfaces 12 and in abutting end to end relationship for movement as a unit along a predetermined horizontal path. For this purpose, the tables are conventionally mounted on grooves or tracks (not shown) along which they are moved as by a pusher mechanism (also not shown).

A layer of plaster is sprayed onto the surface 12 of the tables 11 from a nozzle 13 mounted thereabove. Glass blanks 14 to be surfaced are laid in the plaster on the tables 11 at the laying yard or station 10 shown in FIG. 1, and are carried on the tables from the laying yard to the surfacing area where they are conveyed successively beneath a series of grinding and then beneath a series of polishing units. From the surfacing area the sheets are carried to a stripping yard where they are removed from the tables and then returned to the laying yard where they are relaid with the ground and polished surface down to allow the second surface to be finished. The tables are cleansed of the remaining plaster and are likewise returned to the laying yard to receive additional glass blanks. The laying of the glass blanks on the tables and their removal therefrom is usually accomplished by means of suitable suction frames hung from a traveling crane.

As explained above, it is customary to secure the glass blanks 14 to be ground and polished to the tops of the tables 11 by bedding them in a layer of plaster, or a similar material adapted to hydrate upon the addition of a liquid, which has been sprayed onto the surface of the table. Heretofore, the plaster as received from the manufacturers has merely been formed as a liquid suspension or slurry and sprayed onto the tables. It has now been determined that due to the aforementioned relatively large grain size of commercially available plaster and the presence of a significant amount of oversize particles therein, the bonding action of the plaster and the support it provides for the sheet are not uniform over the entire area of the sheet.

The mill 15 of the invention pulverizes the plaster so that all oversize particles are eliminated and the range of particle sizes is narrowed, that is, the particles are smaller and more nearly uniform in size. For example, in commercially available plaster normally used for this purpose, 4 to 5 percent may be retained on a standard 100 mesh screen and 45 percent on a 325 mesh screen. After processing according to the invention, substantially all of the plaster will pass a 100 mesh screen and all but a trace will pass a 325 mesh screen. As a result of this smaller and more uniform particle size, it is possible to substantially reduce the thickness of the layer of plaster on the surface 12 of the tables and yet obtain a bond between the sheet and table which is equal to or stronger than that previously obtained with the best grades of plaster. Thus, the plaster layer has been reduced to a thickness of from .001 to .003 inch according to the invention, thereby effecting a saving of from 30 to 50 percent in plaster over the previously employed method. The reduction in thickness of the plaster layer is made possible by the absence of unusually large particles, which create areas of high localized pressure, and smaller particle size and resulting increased surface area of the plaster which creates a better bond. Due to the greater surface area and smaller particle size, hydration of the plaster is also accelerated so that the maximum bond strength may be achieved in much less time than in conventional blank laying procedures.

As illustrated in FIG. 1, a colloid mill 15 is mounted on a platform 16 above the supporting tables 11 for supplying a slurry of finely divided plaster to the nozzle 13. The platform is mounted on a suitable framework 17 carried by a bridge 18 extending over the tables.

The colloid mill includes a grinding head 19 driven through a gear box 20 by a suitable electric motor 21. Through the gear box, rotation of the impeller mechanism within the grinding head is increased to a peripheral speed in the neighborhood of 10,000 feet per minute.

A slurry or suspension of plaster in water, proportioned and mixed in a conventional manner, is pumped into the grinding head 19 under pressure through a supply line 22. Heretofore, the plaster slurry sprayed onto the tables was comprised of about 1 part plaster dispersed in 1 to 2 parts of water, by weight. Due to the smaller particle size and increased rate of hydration of the plaster according to the invention, 1 part of plaster is generally dispersed in about 2 to 3 or more parts of water in preparing the slurry. As will be hereinafter more fully described, the particles of plaster above a desired maximum size are pulverized within the grinding head of the colloid mill, and the slurry containing only particles smaller than the predetermined maximum is carried through a discharge line 23 to the spray nozzle 13.

The nozzle is mounted on the bridge 18 by means of a hinged and jointed bracket 24 for universal adjustment. Thus, the nozzle is arranged above the tables 11 so that the spray therefrom will cover the surface 12 of the tables with a uniform coating of plaster entirely across their width. Since the variation in particle size is substantially reduced and the heretofore troublesome oversize particles are completely eliminated, the plaster can be deposited in a layer of substantially uniform thickness and particle size distribution.

The pulverizing head 19 of a colloid mill particularly adapted to preparing the plaster slurry for forming the bedding layer is illustrated in FIG. 2. Colloid mills are conventionally employed in grinding materials which remain in suspended, liquid form for an extended period of time, if not indefinitely. The slurry or liquid suspension, in conventional practice, is fed into the top of the grinding unit by gravity and is withdrawn from the bottom after pulverizing. Such conventional units have been found unsatisfactory for preparing a plaster slurry according to the invention due to the fact that flow through certain areas thereof is rather slow, and the units contain stationary seals so that the plaster tends to hydrate or set up within the pulverizing unit and block the flow of the slurry or liquid suspension therethrough.

In the pulverizing head 19 of the invention, the slurry is fed into the end of the unit from the supply line 22. As will be hereinafter explained, the slurry is forced through the colloid mill and out through the nozzle 13 under pressure so that constant movement of the slurry is maintained. A pressure in the range from about 5 to 15 p.s.i. has generally been found satisfactory, although it may go as high as 50 p.s.i. The pulverizing head includes a housing 25 through which a shaft 26, driven by the gear box 20 and motor 21, extends. An impeller or rotor 27, having vanes 28 thereon, is mounted on the end of the shaft by a nut 29, and a sleeve 30 behind the impeller is slidable along the shaft and is adapted to rotate with the shaft and impeller. The sleeve has a flange 31 at one end on which is carried a rotating sealing ring 32. A coil spring 33 abuts a pressure ring 34 behind the impeller and urges the sleeve and sealing ring 32 thereon against a stationary sealing ring 35 carried within a recess in the housing 25. The gear box 20 is thus sealed against the entry of liquid from the pulverizing head 19, while at the same time the rotation of the sleeve and coil spring create sufficient turbulence in the slurry to prevent the plaster from setting before it is discharged through the line 23 to the nozzle 13.

A stator 36 of ceramic or a similar wear resistant material, and a holder 37 therefor, are maintained in position within a recess 38 in the housing 25 by a retaining ring 39. A circular gasket 40 is positioned between a lip on the retaining ring and the stator and holder 36 and 37, respectively. A face plate 41 is urged against the circular gasket 40 by clamping members 42 to form a chamber 43 therebehind. Bolts 44 threaded into the retaining ring have wing nuts 45 thereon for retaining the clamping members. The supply line 22 is in communication with the chamber 43 through a tap 46 in the face plate.

Reviewing the invention briefly, a slurry of plaster suspended in water is prepared in a suitable manner, the details of which are well known in the plate glass grinding and polishing art and which do not constitute part of the present invention. The slurry, containing plaster having a relatively wide variation in particle size and having a small amount of oversize particles which are much larger than the average, is forced into the chamber 43 of the colloid mill under pressure.

The impeller or rotor 27 and the stator 36 are adjusted so that the gap therebetween will only permit passage of particles below a predetermined size. Thus, particles smaller than this maximum will be carried in suspension between the impeller and wear ring and into the discharge line 3.

The rotating impeller 27 and vanes 28 therein cause the suspended particles of larger than the desired maximum size to be thrown against each other and against the particles in the incoming slurry until they become sufficiently divided or worn down to be carried past the impeller and into the discharge line. Due to the restricted opening through which they must pass, no oversize particles can get behind the impeller and into the discharge line. The impeller and rotating seal, including the sleeve 30 and coil spring 33, create sufficient turbulence in the slury within the chamber behind the impeller so that the plaster will not set up and block passage to the discharge line.

Since the slurry enters and is forced through the pulverizing head of the colloid mill under pressure, it is forced by this pressure through the discharge line and out the nozzle 13 to be deposited as a spray upon the surfaces 12 of the tables 11 passing therebeneath in a thin uniform layer. Intensity of the spray is controlled by regulating the pressure at which the slurry is supplied to the pulverizing head from the line 22. Glass blanks are then laid on the plaster and pressed downwardly to eliminate air pockets and securely bed the blank.

As aforementioned, the absence of oversize particles in the plaster layer makes possible substantial savings in plaster by virtue of the fact that the thickness of the layer can be reduced. While the thickness is reduced to as little as .001 to .003 inch, weak spots are eliminated and the over all bond is equal to or better than that heretofore attained. Furthermore, the rate of hydration is accelerated so that the bond achieves its maximum strength in less time than in previous modes of bedding glass blanks.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

We claim:

1. In a method of bedding a glass blank in a plaster-like material on a surfacing table, the steps of forming a fluid suspension of the bedding material, reducing the suspended particles of bedding material to a size not larger than a predetermined maximum, depositing the fluid suspension of bedding material on said surfacing table in a thin, uniform layer, and laying a glass blank on said layer of bedding material while said layer is still wet and fluid.

2. In a method of bedding a glass blank in a plaster-like material on a surfacing table, the steps of forming a fluid suspension of the bedding material, reducing the size of substantially all of the particles greater than a predetermined maximum in said bedding material to a size not larger than said predetermined maximum, spraying the fluid suspension of bedding material onto said surfacing table in a substantially uniform layer, and laying a glass blank on said layer of bedding material while said layer is still wet and fluid.

3. In a method of bedding a glass blank in a plaster-like material on a surfacing table, the steps of forming a fluid suspension of the bedding material, reducing the size of the particles in said bedding material which are above a predetermined maximum to a size not larger than said predetermined maximum, spraying the fluid suspension of said bedding material onto said surfacing table in a layer of substantially uniform thickness, laying a glass blank on said layer of bedding material while said layer is still wet and fluid, pressing said blank against said layer to expel air therefrom, and allowing said bedding material to set and bond said blank to said table.

4. A method of bedding a glass blank in a plaster-like material on a surfacing table as claimed in claim 3, wherein said layer of bedding material does not exceed .003 inch in thickness.

5. A method of bedding a glass blank in a plaster-like material on a surfacing table as claimed in claim 3, wherein said layer of bedding material is between about .001 and .003 inch in thickness.

6. In a method of bedding a glass blank in a plaster-like material on a surfacing table, the steps of forming a fluid suspension of the bedding material, passing said fluid suspension through a colloid mill to reduce the size of particles in said bedding material which are greater than a predetermined maximum to a size not larger than said maximum, constantly agitating said fluid suspension while passing through said colloid mill in order to prevent said plaster-like material from setting up within said mill, spraying the fluid suspension of said bedding material from a fixed source onto the surfacing table as said surfacing table moves beneath said fixed source, laying a glass blank on said layer of bedding material while said layer is still wet and fluid, pressing said blank against said layer to expel air therefrom, and allowing said plaster-like material to set and bond said blank to said table.

7. In apparatus for bedding glass blanks in a plaster-like material on surfacing tables, a plurality of tables moving along a fixed path, means for forming a fluid suspension of the bedding material, pulverizing means for receiving the fluid suspension and reducing the suspended particles of bedding material to a size not greater than a predetermined maximum, means for depositing said plaster-like material on the surface of said tables in a relatively thin, uniform layer, and means for laying a glass blank of said layer of bedding material.

8. Apparatus for bedding glass blanks in a plaster-like material on surfacing tables as claimed in claim 7, wherein said means for depositing said plaster-like material comprises a spray means, and said pulverizing means comprises a colloid mill through which the fluid suspension is forced under a pressure sufficient to emit said fluid suspension from said spray means.

9. In apparatus for bedding glass blanks in a plaster-like material on surfacing tables, a colloid mill including a grinding head, means for supplying a fluid suspension of said plaster-like material to the grinding head, said grinding head including a shaft, a rotor mounted upon said shaft, means for rotating said shaft and the rotor mounted thereon, sealing means mounted on said shaft for rotation therewith to seal off said fluid suspension from said drive means while preventing the setting of plaster on said sealing means, and a line through which said fluid suspension is discharged from said grinding head to be deposited on said surfacing tables.

10. Apparatus for bedding glass blanks in a plaster-like material on surfacing tables as claimed in claim 9, including a stator surrounding said impeller and spaced slightly therefrom, and a chamber in which said fluid suspension of plaster-like material is received under pressure, said chamber being in communication with said stator whereby said fluid suspension is forced between said stator and said rotor and into the discharge line.

11. In apparatus for bedding glass blanks in a plaster-like material on surfacing tables, a plurality of said tables movable along a fixed path, a colloid mill for receiving a fluid suspension of said plaster-like bedding material and reducing the particles therein to a size not greater than a predetermined maximum, spray means mounted above the path of said tables for spraying said fluid suspension of bedding material onto said tables in a thin, uniform layer as said tables pass beneath said spray means, and means for laying a glass blank on said layer of bedding material while said layer is still wet and fluid.

12. Apparatus for bedding glass blanks in a plaster-like material on surfacing tables as claimed in claim 11, wherein said fluid suspension is received in said colloid mill and discharged through said spray means under a pressure of from about 5 to 15 p.s.i.

13. Apparatus for bedding glass blanks in a plaster-like material on surfacing tables as claimed in claim 11, wherein said layer of bedding material is between about .001 and .003 inch in thickness.

References Cited

UNITED STATES PATENTS

| | | | |
|---|---|---|---|
| 1,980,589 | 11/1934 | Acree | 241—221 X |
| 2,333,456 | 11/1943 | Wynn | 241—27 X |
| 3,149,789 | 9/1964 | Szegvari | 241—27 |
| 3,241,775 | 3/1966 | Clendaniel et al. | 241—27 X |
| 3,331,560 | 7/1967 | Hodgson et al. | 241—244 X |
| 3,355,342 | 11/1967 | Lanman | 156—295 |
| 3,331,560 | 7/1967 | Hodgson et al. | 241—244 |

HAROLD ANSHER, *Primary Examiner.*

U.S. Cl. X.R.

65—60, 61; 156—299, 575, 578; 241—27, 221, 244, 278